Nov. 11, 1947.                R. H. GILL                2,430,563
                    TOOL FOR UPSETTING HOLLOW RIVETS
                         Filed Nov. 21, 1945
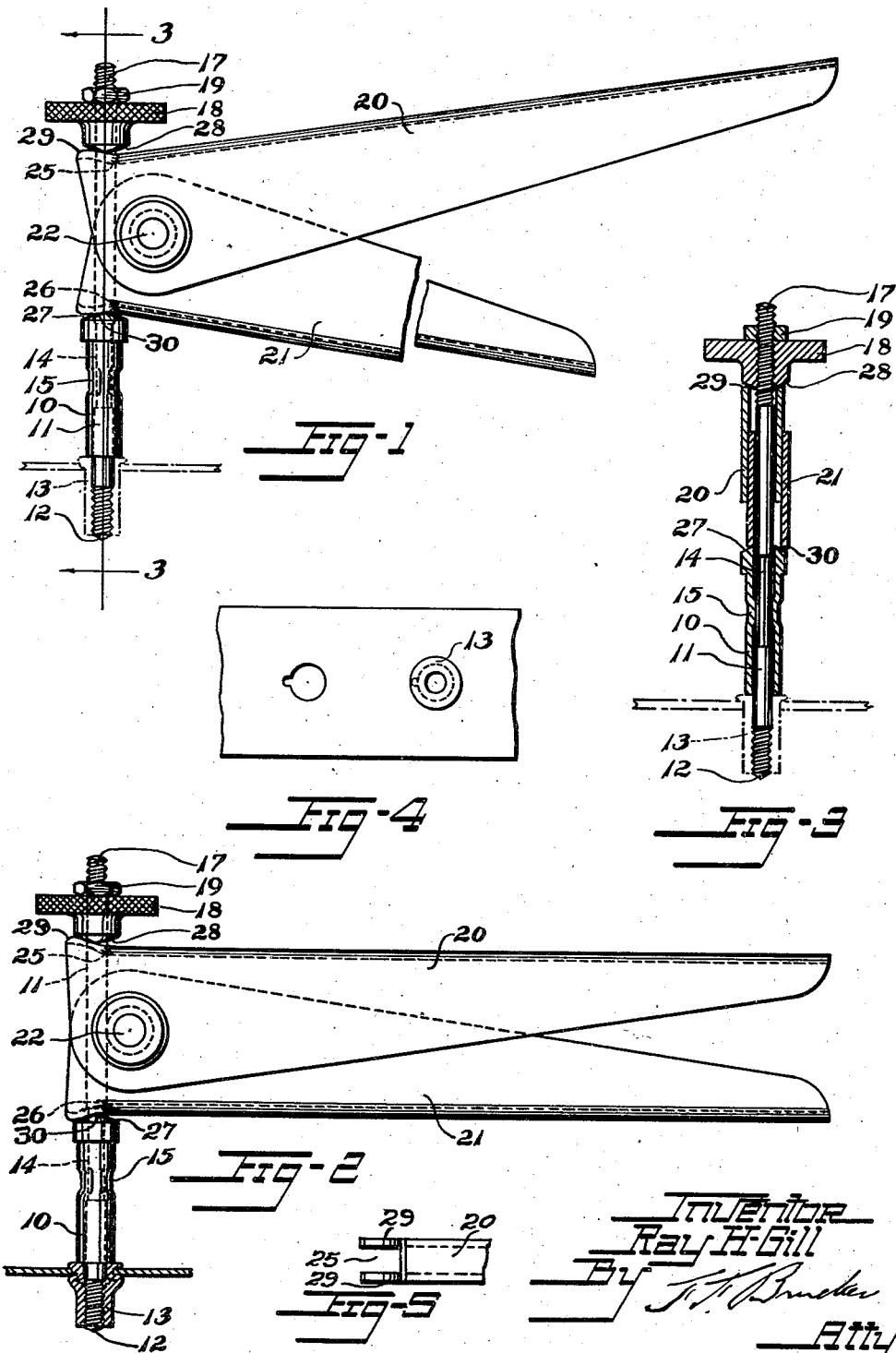

Patented Nov. 11, 1947

2,430,563

UNITED STATES PATENT OFFICE 2,430,563

TOOL FOR UPSETTING HOLLOW RIVETS

Ray H. Gill, Akron, Ohio, assignor to The B. F. Goodrich Company, New York, N. Y., a corporation of New York Application November 21, 1945, Serial No. 630,051

6 Claims. (Cl. 218—19)

This invention relates to tools for upsetting hollow internally threaded rivets such as the rivet shown in the Waner Patent No. 2,069,907.

Objects of the invention are to provide a powerful tool of small size, to provide for quick change from one size of rivet to another, to provide for operation in close quarters, to provide for convenient adjustability for different degrees of upset of the rivet, and to provide simplicity of construction.

These and other objects will appear from the following description and the accompanying drawings.

Of the drawings,

Fig. 1 is a side elevation of a tool constructed in accordance with and embodying the invention, the position of the rivet and the wall to which it is to be secured being indicated in dot-and-dash lines, parts being broken away, Fig. 2 is a similar view showing the tool in the final position of upsetting the rivet, the rivet and the wall to which it is applied being shown in section, Fig. 3 is a sectional view of the tool, taken on line 3—3 of Fig. 1, Fig. 4 is a plan view of a portion of a wall showing at the left an aperture for receiving a rivet and at the right a rivet in place in such an aperture before the rivet is upset, Fig. 5 is a top plan view of one end of an element of the tool.

Referring to the drawings, the numeral 10 designates a short tubular barrel open at both ends. A rod 11 extends through the barrel and has a threaded portion 12 at one end thereof for engaging the threads of the rivet 13. For restricting axial movement of the rod and barrel axially of each other while permitting rotation of the rod with relation to the barrel, the rod is formed with an intermediate portion 14 of reduced diameter and the barrel 10 is provided with a constricted portion 15 of less length, preferably provided by crimping of the barrel to force some of the material thereof at regularly spaced intervals into the space provided by reduction of diameter of the rod. The arrangement is such that the rod may be moved axially relative to the barrel by an amount necessary to upset the rivet but is restricted against further movement.

For rotating the rod 11 to engage or disengage it in the threads of the rivet, the end of the rod opposite to the threaded end 12 is also threaded, as at 17. A threaded thumb nut 18 is located near the end of the rod 11 and is locked in position thereon by a jam nut 19. The arrangement is such that the thumb nut may be adjusted by threading it along the rod and may be locked by the jam nut at a desired position.

For upsetting the rivet, a pair of levers 20, 21 of U-shaped cross-section, are fulcrumed upon each other about a fulcrum pin 22, the levers being arranged with their hollow sides toward each other and in intercalated overlapping relation as shown in Fig. 3 with the fulcrum pin extending through both levers. At a position relatively close to the fulcrum pin, the levers are notched, as at 25, 26 to receive the rod 11 and portions adjacent the notches are inclined outwardly from the handle portions thereof to provide seats 29 and 30 for impinging against a rounded end 27 of the barrel 10 and a rounded end 28 of the thumb nut 18 respectively. The levers 20, 21 extend in the opposite direction from the fulcrum pin to provide hand levers whereby the rod 11 and barrel 10 may be moved relative to each other to separate the barrel and thumb nut and thereby provide for upsetting the rivet. Due to the close proximity of the fulcrum pin to the portions 25, 26 a toggle lever action is provided which exerts great force against the rivet with a relatively light squeeze of the handles.

Due to the fact that the rod 11 extends through slots in the ends of the levers 20, 21 the rod and barrel assembly are readily removable from the levers and may be quickly replaced by an assembly adapted to collapse a rivet having a different thread or of another size. Also the separability of the rod and barrel assembly from the leverage system permits entry of the assemblies separately into close quarters and assembly therein for operation.

Operation of the tool is as follows: With the rod and barrel assembly held in one hand with the thumb and forefinger grasping the knurled nut 18, a rivet 13 is threaded onto the rod end 12 either by holding the rivet with the other hand and twirling the rod or by holding the rod stationary and twirling the rivet until the threads of the rod are fully engaged in the rivet and the rivet has moved the barrel to its extent of movement toward the thumb nut. The rivet is then inserted in the aperture in the wall to which it is to be secured together with the rod and barrel assembly. The lever assembly is then placed over the rod and barrel assembly between the barrel and the thumb nut and pressure applied to force the handles toward each other to upset the rivet.

After upsetting of the rivet, the handles are released and the lever assembly withdrawn. The thumb nut 18 is then rotated to back the rod out of the rivet.

Variations may be made without departing from the scope of the invention as it is defined by the following claims.

I claim:

1. A tool for upsetting a hollow internally threaded rivet, said tool comprising a rod having a threaded portion adapted to be inserted in the rivet, a hollow anvil through which said rod extends for axial movement relative thereto, said anvil having an abutment thereon, a member mounted on said rod for adjustment along the same and having at an end thereof an abutment thereon spaced from the first said abutment and comprising an annular surface on said member extending around said rod, and means interposed between said abutments for urging the same apart to move said tubular anvil and rod relatively in the axial direction, said means comprising a pair of relatively movable elements one of which engages one of said abutments and the other of which elements engages the other abutment.

2. A tool for upsetting a hollow internally threaded rivet, said tool comprising a rod having spaced-apart threaded portions one of which is adapted to be inserted in the rivet, a tubular member through which said rod extends for axial movement relative thereto, said anvil having a rounded abutment thereon, an adjusting member threadedly engaging the other of said threaded portions for adjustment along the same and having an abutment thereon comprising a rounded annular surface on said member extending around said rod, and means interposed between said abutments for urging the same apart to move said tubular anvil and rod relatively in the axial direction, said means comprising a pair of relatively movable elements one of which engages one of said abutments and the other of which elements engages the other abutment.

3. A tool for upsetting a hollow internally threaded rivet, said tool comprising a tubular anvil, a rod extending axially therethrough, said rod and said anvil having axial movement relative to each other, means on said rod spaced axially from said anvil for rotating said rod relative to said anvil, said anvil and said rotating means having opposed abutments, and lever means removably positionable between said abutments for engaging said abutments to move said rod and said anvil axially relative to each other.

4. A tool for upsetting a hollow internally threaded rivet, said tool comprising a tubular anvil, a rod extending axially therethrough, said rod and said anvil having axial movement relative to each other, means on said rod spaced axially from said anvil for rotating said rod relative to said anvil, said anvil and said rotating means having opposed abutments, and lever means removably positionable between said abutments for engaging said abutments to move said rod and said anvil axially relative to each other, said lever means having open-slotted ends with cooperating seats for engaging said abutments.

5. A tool for upsetting a hollow internally threaded rivet, said tool comprising a tubular anvil, a rod extending axially therethrough, said rod and said anvil having cooperating means limiting axial movement thereof relative to each other, means on said rod spaced axially from said anvil for rotating said rod relative to said anvil, said anvil and said rotating means having opposed abutments, and lever means removably positionable between said abutments to move said rod and said anvil axially relative to each other, said lever means having open slotted ends for engaging said abutments.

6. A tool for upsetting a hollow internally threaded rivet, said tool comprising a tubular anvil, a threaded rod extending axially therethrough, said rod and said anvil having cooperating means limiting axial movement thereof relative to each other, means on said rod spaced axially from said anvil for rotating said rod relative to said anvil, said anvil and the last said means having opposed rounded abutments, and lever means removably positionable between said abutments to move said rod and said anvil axially relative to each other, said lever means having open slotted ends with oppositely disposed seats for engaging said abutments.

RAY H. GILL.

REFERENCES CITED

The following references are of record in the file of this patent:

UNITED STATES PATENTS

| Number | Name | Date |
|---|---|---|
| 1,553,623 | McLeod | Sept. 15, 1925 |
| 1,619,162 | Strodel | Mar. 1, 1927 |
| 2,187,929 | Blanc | Jan. 23, 1940 |
| 2,324,104 | Moss | July 13, 1943 |
| 2,342,479 | Miles | Feb. 22, 1944 |
| 2,384,347 | Schutz | Sept. 4, 1945 |
| 2,386,939 | Desmet | Oct. 16, 1945 |